United States Patent
Mehn et al.

(10) Patent No.: US 10,189,106 B2
(45) Date of Patent: Jan. 29, 2019

(54) REDUCED ENERGY WELDING SYSTEM AND METHOD

(71) Applicant: ILLINOIS TOOL WORKS INC., Glenview, IL (US)

(72) Inventors: Peter Donald Mehn, Oshkosh, WI (US); Caleb Haven, Appleton, WI (US); Richard Martin Hutchison, Iola, WI (US); James Lee Uecker, Freedom, WI (US)

(73) Assignee: Illinois Tool Works Inc., Glenview, IL (US)

( * ) Notice: Subject to any disclaimer, the term of this patent is extended or adjusted under 35 U.S.C. 154(b) by 719 days.

(21) Appl. No.: 14/567,665

(22) Filed: Dec. 11, 2014

(65) Prior Publication Data

US 2016/0167151 A1 Jun. 16, 2016

(51) Int. Cl.
| | |
|---|---|
| *B23K 9/095* | (2006.01) |
| *B23K 9/09* | (2006.01) |
| *B23K 9/10* | (2006.01) |
| *B23K 9/173* | (2006.01) |

(52) U.S. Cl.
CPC ............ *B23K 9/091* (2013.01); *B23K 9/092* (2013.01); *B23K 9/095* (2013.01); *B23K 9/0953* (2013.01); *B23K 9/0956* (2013.01); *B23K 9/1062* (2013.01); *B23K 9/173* (2013.01)

(58) Field of Classification Search
CPC ........ B23K 9/091; B23K 9/092; B23K 9/095; B23K 9/0953; B23K 9/0956; B23K 9/1062; B23K 9/173
See application file for complete search history.

(56) References Cited

U.S. PATENT DOCUMENTS

| | | | |
|---|---|---|---|
| 2,365,958 | A | 12/1944 | Holslag |
| 2,416,047 | A | 2/1947 | Dolan |
| 3,288,982 | A | 11/1966 | Haruyoshi |
| 3,725,629 | A | 4/1973 | Vickers |
| 3,809,853 | A | 5/1974 | Manz |
| 3,849,871 | A | 11/1974 | Kaunitz |
| 3,946,349 | A | 3/1976 | Haldeman |

(Continued)

FOREIGN PATENT DOCUMENTS

| | | |
|---|---|---|
| CA | 2072711 | 12/1992 |
| CN | 2181354 | 11/1994 |

(Continued)

OTHER PUBLICATIONS

International Search Report from PCT application No. PCT/US2015/056121, dated Apr. 4, 2016, 11 pgs.

(Continued)

*Primary Examiner* — Brian W Jennison
(74) *Attorney, Agent, or Firm* — McAndrews, Held & Malloy, Ltd.

(57) ABSTRACT

A welding regime may implements cyclic short circuits under a closed loop voltage control approach. Upon clearing or imminent clearing of the short circuit, a current recess is implemented. The current recess reduces the current that would otherwise be applied to the weld, resulting in multiple benefits. The recess may be implemented by suspending voltage command signals. Following the current recess, normal control is resumed with the then-current voltage command.

18 Claims, 4 Drawing Sheets

(56) References Cited

U.S. PATENT DOCUMENTS

| | | |
|---|---|---|
| 4,160,967 A | 7/1979 | Beech |
| 4,188,419 A | 2/1980 | Detert |
| 4,222,023 A | 9/1980 | Beech |
| 4,426,565 A | 1/1984 | Rueter |
| 4,447,703 A | 5/1984 | Stol |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,580,026 A | 4/1986 | Stol |
| 4,628,182 A | 12/1986 | Hori |
| 4,631,385 A | 12/1986 | Rothermel |
| 4,667,083 A | 5/1987 | Stol |
| 4,728,761 A | 3/1988 | Mucha |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,001,326 A | 3/1991 | Stava |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,526,561 A | 6/1996 | McGaffigan |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn |
| 5,773,799 A | 6/1998 | Maxfield |
| 5,783,799 A | 7/1998 | Geissler |
| 5,844,193 A | 12/1998 | Nomura |
| 5,963,022 A | 10/1999 | Buda |
| 5,968,587 A | 10/1999 | Frankel |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,090,067 A | 7/2000 | Carter |
| 6,107,602 A | 8/2000 | Geissler |
| 6,115,273 A | 9/2000 | Geissler |
| 6,169,263 B1 | 1/2001 | Derby |
| 6,204,476 B1 | 3/2001 | Reynolds |
| 6,248,976 B1 | 6/2001 | Blankenship |
| 6,265,688 B1 | 7/2001 | Lyshkow |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear |
| 6,515,259 B1 | 2/2003 | Hsu |
| 6,583,386 B1 | 6/2003 | Ivkovich |
| 6,596,970 B2 | 7/2003 | Blankenship |
| 6,624,388 B1 | 9/2003 | Blankenship |
| 6,642,482 B2 | 11/2003 | Rappl |
| 6,670,579 B2 | 12/2003 | Davidson |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,984,806 B2 | 1/2006 | Huismann |
| 6,995,338 B2 | 2/2006 | Hutchison |
| 7,002,103 B2 | 2/2006 | Holverson |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,683,290 B2 | 3/2010 | Daniel |
| 8,203,100 B2 | 6/2012 | Ueda |
| 8,288,686 B2 | 10/2012 | Kaufman |
| 8,487,215 B2 | 7/2013 | Holverson |
| 9,403,231 B2 | 8/2016 | Hutchison |
| 9,539,662 B2 | 1/2017 | Hutchison |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1* | 11/2004 | Hutchison ............ B23K 9/09 219/130.21 |
| 2004/0238511 A1 | 12/2004 | Matus |
| 2005/0184039 A1 | 8/2005 | Stava |
| 2005/0269306 A1 | 12/2005 | Fulmer |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0223840 A1* | 9/2008 | Era ............... B23K 9/092 219/130.21 |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0173726 A1 | 7/2009 | Davidson |
| 2010/0059493 A1 | 3/2010 | McAninch |
| 2010/0096373 A1 | 4/2010 | Hillen |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0297658 A1 | 8/2011 | Peters |
| 2011/0248007 A1 | 10/2011 | Takeda |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0264323 A1* | 10/2013 | Daniel ............... B23K 9/093 219/137 PS |
| 2013/0270245 A1 | 10/2013 | Holverson |
| 2014/0021183 A1 | 1/2014 | Peters |

(56) References Cited

U.S. PATENT DOCUMENTS

| | | |
|---|---|---|
| 2014/0158669 A1 | 6/2014 | Davidson |
| 2014/0183176 A1 | 7/2014 | Hutchison |
| 2014/0217077 A1 | 8/2014 | Davidson |
| 2014/0251971 A1 | 9/2014 | Hearn |
| 2014/0263237 A1 | 9/2014 | Daniel |
| 2014/0263241 A1 | 9/2014 | Henry |
| 2014/0263243 A1 | 9/2014 | Marschke |
| 2014/0367370 A1 | 12/2014 | Hutchison |
| 2015/0001197 A1 | 1/2015 | Marschke |
| 2015/0083702 A1 | 3/2015 | Scott |
| 2015/0105898 A1 | 4/2015 | Adams |
| 2016/0074954 A1 | 3/2016 | Marschke |
| 2016/0144444 A1 | 5/2016 | Davidson |
| 2016/0318112 A1 | 11/2016 | Hutchison |

FOREIGN PATENT DOCUMENTS

| | | |
|---|---|---|
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101804495 | 8/2010 |
| CN | 101862886 | 10/2010 |
| CN | 102049595 | 5/2011 |
| CN | 102470473 | 5/2012 |
| CN | 102554418 | 7/2012 |
| CN | 102596475 | 7/2012 |
| CN | 102770228 | 11/2012 |
| CN | 102770229 | 11/2012 |
| CN | 202824943 | 3/2013 |
| DE | 2501928 | 7/1976 |
| DE | 19808383 | 9/1999 |
| EP | 0194045 | 9/1986 |
| EP | 0387223 | 9/1990 |
| EP | 1232825 | 8/2002 |
| EP | 2218537 | 8/2010 |
| EP | 2286949 | 2/2011 |
| FR | 1443701 | 6/1966 |
| JP | S5719166 | 2/1982 |
| JP | S57109573 | 7/1982 |
| JP | S60108175 | 6/1985 |
| JP | S60108176 | 6/1985 |
| JP | S6471575 | 3/1989 |
| JP | H3285768 | 12/1991 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |

OTHER PUBLICATIONS

"ALT 304," Miller—The Power of Blue, Jun. 2001.
"Maxstar 200 SD, DX, and LX," Miller Electric Mfg. Co., Oct. 2003.
Bondy et al., "Graph Theory with Appliations," University of Waterloo, 1976, p. 7-8.

\* cited by examiner

REDUCED ENERGY WELDING SYSTEM AND METHOD

BACKGROUND

The invention relates generally to welders, and more particularly to a welder configured to perform a welding operation in which a waveform is applied to welding wire as the wire is advanced from a welding torch.

A wide range of welding systems and welding control regimes have been implemented for various purposes. A number of continuous welding operations are known, such as gas metal arc welding (GMAW), flux cored arc welding (FCAW) and so forth. Certain of these are sometimes referred to as metal inert gas (MIG) techniques. In general, they allow for formation of a continuing weld bead by feeding welding wire to a welding torch where an arc is established between the welding wire and a workpiece to be welded. Electrical power is applied to the welding wire and a circuit is completed through the workpiece to sustain the arc that melts the wire and the workpiece to form the desired weld.

Advanced forms of MIG welding are based upon generation of power in the welding power supply. That is, various regimes may be carried out in which current and/or voltage waveforms are commanded by the power supply control circuitry to regulate the formation and deposition of metal droplets from the welding wire, to sustain a desired heating and cooling profile of the weld pool, to control shorting between the wire and the weld pool, and so forth.

While very effective in many applications, such regimes may be subject to drawbacks. For example, depending upon the transfer mode, the processes may either limit travel speed, create excessive spatter (requiring timely cleanup of welded workpieces), provide less than optimal penetration, or any combination of these and other effects. Moreover, certain processes, such as ones operating in a spray mode of material transfer, may run excessively hot for particular applications. Others, such as short circuit processes, may run cooler, but may again produce spatter and other unwanted weld effects.

Moreover, in certain welding situations and with certain welding electrodes, welding processes that are trained to implement cyclic short circuits between the electrode and the workpiece may add excessive energy to the weld. In short circuit processes, while short circuits are intended between the electrode and the workpiece, the behavior of the system during and following the short circuits may be key to ensuring a smooth process, improving weld characteristics, reducing energy input, and so forth.

There is a need, therefore, for improved welding strategies that allow for welding in waveform regimes while improving weld quality and system performance.

BRIEF DESCRIPTION

The present invention provides welding systems designed to respond to such needs. In accordance with an exemplary implementation, a welding system comprises power circuitry configured to convert incoming power from a source to welding power, and control circuitry coupled to the power circuitry and configured to implement a control regime to control the welding power output by the power circuitry in a welding operation. The control regime comprises closed loop control of voltage, detection of a predetermined rate of change of a welding parameter, suspension of closed loop control of voltage and implementation of a current recess, followed by resumption of closed loop control of voltage.

The invention also provides methods for welding, such as, in accordance with one aspect, implementing a voltage closed loop control of welding power in a welding regime, monitoring welding power parameters, identifying a rate of change of at least one welding power parameter, suspending voltage closed loop control of the welding power upon determination that the rate of change of the at least one welding power parameter has reached or exceeded a threshold to create a current recess, and resuming voltage closed loop control of welding power following the current recess.

DRAWINGS

DETAILED DESCRIPTION

Figure 1:
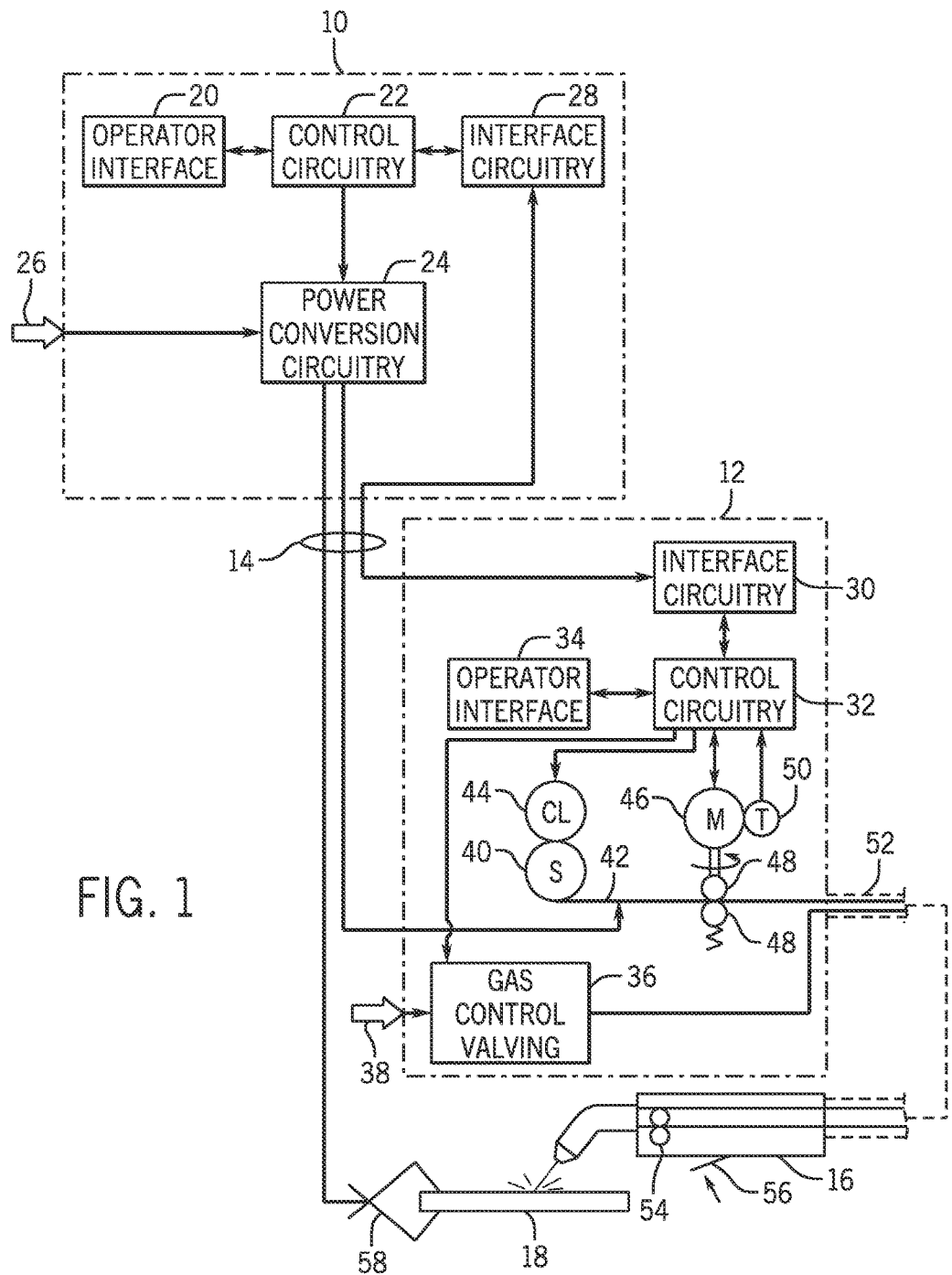
FIG. 1 is a diagrammatical representation of an exemplary MIG welding system illustrating a power supply coupled to a wire feeder for performing welding operations in accordance with aspects of the present techniques.

Turning now to the drawings, and referring first to FIG. 1, an exemplary welding system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a welding location. However, it should be understood that the wire feeder, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor is typically run to the welding workpiece so as to complete an electrical circuit between the power supply and the workpiece.

The system is designed to allow for weld settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for MIG welding with various steels, aluminums, or other welding wire that is channeled through the torch. These weld settings are communicated to control circuitry 22 within the power supply. The system may be particularly adapted to implement welding regimes designed for certain electrode types, and where desired these may be selected via the operator interface.

The control circuitry, described in greater detail below, operates to control generation of welding power output that is applied to the welding wire for carrying out the desired welding operation. In certain presently contemplated embodiments, for example, the control circuitry may be adapted to regulate a short circuit MIG welding regime that makes and breaks short circuits between the welding electrode and the workpiece while reducing energy into the weld by selectively implementing a "gap" in a current (or voltage) waveform. In "short circuit" modes, droplets of molten material form on the welding wire under the influence of heating by the welding arc, and these are periodically transferred to the weld pool by contact or short circuits between the wire and droplets and the weld pool. "Short circuit welding" or "short circuit MIG welding" refers to techniques in which a power waveform is generated, such as to control deposition of droplets of metal into the progressing weld puddle. In a particular embodiment of the invention, a specialized welding regime may be implemented in which waveforms and control signals are generated that have characteristics of conventional short circuit welding techniques, while specifically and strategically reducing energy input. It should be noted that while the present disclosure focuses primarily on short circuit welding regimes, the techniques disclosed may also be used with certain pulsed welding regimes in which short circuits may or may not be intentionally created.

The control circuitry is thus coupled to power conversion circuitry 24. This power conversion circuitry is adapted to create the output power, such as waveforms that will ultimately be applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components and a multi-conductor cable run between the interface circuitry to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply via the interface circuitry. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 is also coupled to gas control valving 36 which regulates the flow of shielding gas to the torch. In general, such gas is provided at the time of welding, and may be turned on immediately preceding the weld and for a short time following the weld. The gas applied to the gas control valving 36 is typically provided in the form of pressurized bottles, as represented by reference numeral 38.

The wire feeder 12 includes components for feeding wire to the welding torch and thereby to the welding application, under the control of control circuitry 36. For example, one or more spools of welding wire 40 are housed in the wire feeder. Welding wire 42 is unspooled from the spools and is progressively fed to the torch. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 may be provided for detecting the speed of the motor 46, the rollers 48, or any other associated component so as to provide an indication of the actual wire feed speed. Signals from the tachometer are fed back to the control circuitry 36, such as for calibration as described below.

It should be noted that other system arrangements and input schemes may also be implemented. For example, the welding wire may be fed from a bulk storage container (e.g., a drum) or from one or more spools outside of the wire feeder. Similarly, the wire may be fed from a "spool gun" in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply is applied to the wire, typically by means of a welding cable 52 in a conventional manner. Similarly, shielding gas is fed through the wire feeder and the welding cable 52. During welding operations, the wire is advanced through the welding cable jacket towards the torch 16. Within the torch, an additional pull motor 54 may be provided with an associated drive roller, particularly for aluminum alloy welding wires. The motor 54 is regulated to provide the desired wire feed speed as described more fully below. A trigger switch 56 on the torch provides a signal that is fed back to the wire feeder and therefrom back to the power supply to enable the welding process to be started and stopped by the operator. That is, upon depression of the trigger switch, gas flow is begun, wire is advanced, power is applied to the welding cable 52 and through the torch to the advancing welding wire. These processes are also described in greater detail below. Finally, a workpiece cable and clamp 58 allow for closing an electrical circuit from the power supply through the welding torch, the electrode (wire), and the workpiece for maintaining the welding arc during operation.

It should be noted throughout the present discussion that while the wire feed speed may be "set" by the operator, the actual speed commanded by the control circuitry will typically vary during welding for many reasons. For example, automated algorithms for "run in" (initial feed of wire for arc initiation) may use speeds derived from the set speed. Similarly, various ramped increases and decreases in wire feed speed may be commanded during welding. Other welding processes may call for "cratering" phases in which wire feed speed is altered to fill depressions following a weld. Still further, in certain welding regimes, the wire feed speed may be altered periodically or cyclically.

Figure 2:
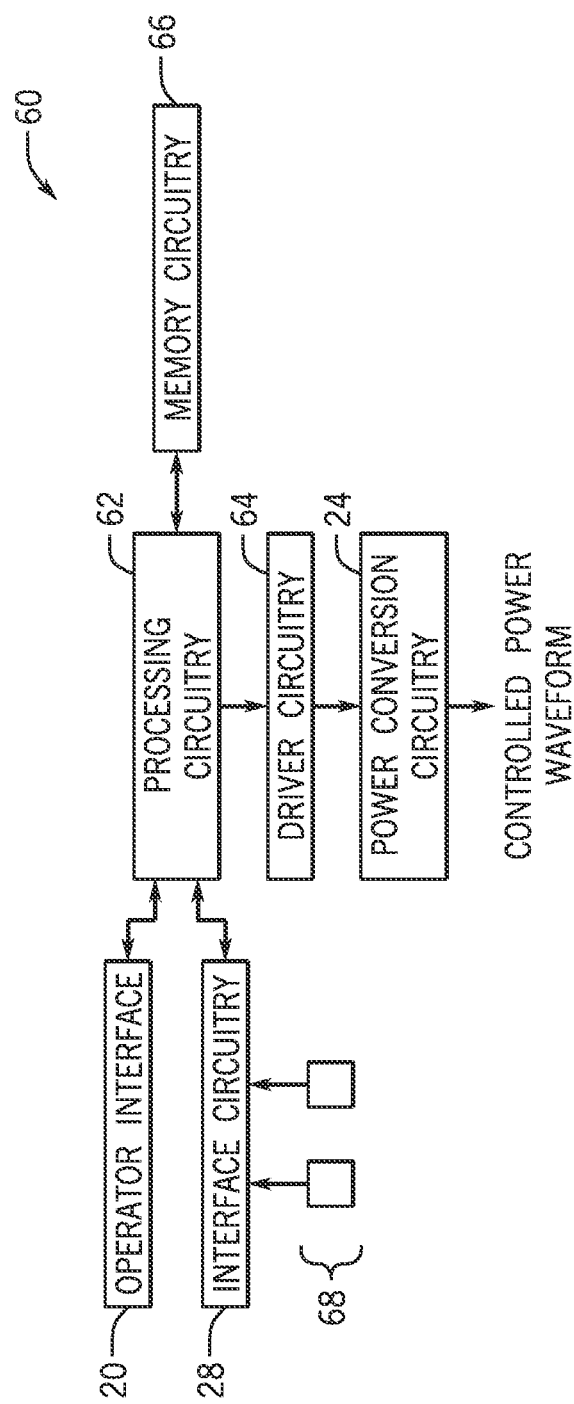
FIG. 2 is a diagrammatical representation of exemplary control circuitry components for a welding power supply of the type shown in FIG. 1.

FIG. 2 illustrates an exemplary embodiment for the control circuitry designed to function in a system of the type illustrated in FIG. 1. The overall circuitry, designated here by reference numeral 60, includes the operator interface 20 discussed above and interface circuitry 28 for communication of parameters to and from downstream components such as a wirefeeder, a welding torch, and various sensors and/or actuators. The circuitry includes processing circuitry 62 which itself may comprise one or more application-specific or general purpose processors, designed to carry out welding regimes, make computations for waveforms implemented in welding regimes, and so forth. The processing circuitry is associated with driver circuitry 64 which converts control signals from the processing to drive signals that are applied to power electronic switches of the power conversion circuitry 24. In general, the driver circuitry reacts to such control signals from the processing circuitry to allow the power conversion circuitry to generate controlled waveforms for welding regimes of the type described in the present disclosure. The processing circuitry 62 will also be associated with memory circuitry 66 which may consist of one or more types of permanent and temporary data storage, such as for providing the welding regimes implemented, storing welding parameters, storing weld settings, storing error logs, and so forth. Sensors and/or actuators, designated generally by reference numeral 68 may be interfaced with the processing circuitry via the interface circuitry 28. In many systems, at least current and voltage sensors will be provided to allow for closed-loop control of the welding power control waveform as described below. Other sensors will typically allow for input of torch trigger signals, among many other signals that may be monitored and/or controlled by the processing circuitry. Here again, it should be noted that some of these parameters or welding operation aspects may be controlled by the wire feeder, or by cooperative control by the power supply and the wire feeder.

More complete descriptions of certain state machines for welding are provided, for example, in U.S. Pat. No. 6,747,247, entitled "Welding-Type Power Supply With A State-Based Controller", issued to Holverson et al. on Sep. 19, 2001; U.S. Pat. No. 7,002,103, entitled "Welding-Type Power Supply With A State-Based Controller", issued to Holverson et al. on May 7, 2004; U.S. Pat. No. 7,307,240, entitled "Welding-Type Power Supply With A State-Based Controller", issued to Holverson et al. on Feb. 3, 2006; and U.S. Pat. No. 6,670,579, entitled "Welding-Type System With Network And Multiple Level Messaging Between Components", issued to Davidson et al. on Sep. 19, 2001, all of which are incorporated into the present disclosure by reference. A method for welding utilizing voltage controlled loops is described in U.S. Pat. No. 6,090,067, entitled "Method and Apparatus for Welding with CV Control", issued on Jun. 21, 2005 to Davidson et al, which is incorporated into the present disclosure by reference. Certain other welding techniques are disclosed in U.S. Pat. No. 6,974,931, entitled "Method and Apparatus for Pulse and Short Circuit Arc Welding", issued on Dec. 13, 2005 to Holverson et al., and U.S. Pat. No. 6,933,466, entitled "Method and Apparatus for Arc Welding with Wire Heat Control", issued on Aug. 23, 2005 to Hutchison et al., both of which are incorporated into the present disclosure by reference. Further, techniques for predicting short circuit clearing in welding processes are disclosed in U.S. patent publication no. 20120061362, entitled "Method and Apparatus for Welding with Short Clearing Prediction", filed on Nov. 12, 2010 by Davidson et al, which is also incorporated into the present disclosure by reference.

Figure 3:
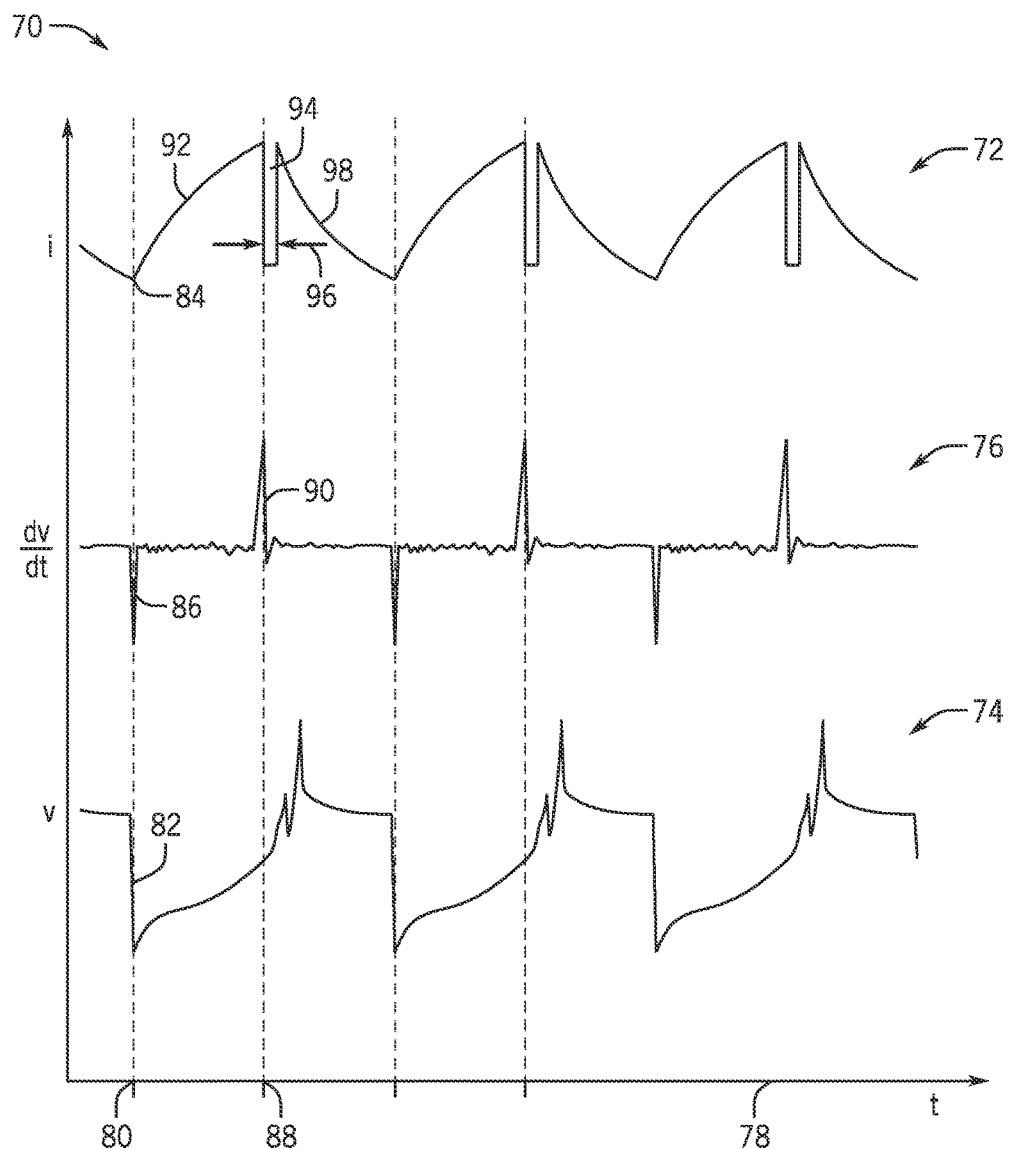
FIG. 3 is a graphical representation of an exemplary waveform for short circuit welding in accordance with the present techniques.

FIG. 3 generally illustrates an exemplary waveform for a welding technique in which molten metal from the welding electrode is transferred to the workpiece by a modified short circuit welding technique. In particular, the technique comprises a welding regime in which the welding power supply control circuitry controls the conversion of incoming power to welding power in a GMAW or similar process. The process is essentially "constant voltage" ("CV"), which in fact entails sensing weld voltage and closing a control loop on voltage so that command signals can be generated that are applied to the power conversion circuitry to have the weld voltage follow a desired profile, reach desired levels, respond in desired ways, and so forth. While control loops can also be closed on other parameters, such as weld current, the weld current will typically respond to the commanded voltage under the dynamics of the process (e.g., wire electrode advance, state of the arc, travel speed, and so forth).

In the new process, a current recess is created that may aid the process in a number of ways. Although the process is based on closed loop control of voltage, the current recess may be produced by temporarily suspending that control and allowing current to drop, then resuming the voltage closed loop control. The drop in current will reduce the energy input into the weld, allowing the weld to run cooler and quieter, reducing spatter, and allowing for a shorter arc and enhanced travel speed. In fact, in a currently contemplated implementation, the welding regime may be a "short circuit" process in which a short circuit is created, expected, or even forced in each cycle such that voltage will drop considerably when the short circuit occurs, then rise sharply when the short circuit clears or begins to clear. It is at this patter point that the current recess is implemented.

As used herein, the term "current recess" refers to a significant and operationally effective drop in current from levels that would prevail or result from otherwise continuing the closed loop voltage control. The effect of the recess can be clearly seen in waveform traces of weld current (as discussed below in connection with FIG. 3), forming a gap or noticeable drop in weld current during the recess period.

It should also be noted that the current recess technique may used with a variety of processes and process settings, including GMAW processes, FCAW processes, and so forth. The processes may be electrode positive as well as electrode negative, or the polarity may be reversed during the process. In some cases, electrode negative (sometimes called "straight polarity") may be preferred so as to enhance removal of energy from the welding arc.

FIG. 3 illustrates waveforms for a welding regime 70 that implements the current recess technique disclosed. The figure shows 3 cycles of a welding process, with a current trace 72, a voltage trace 74, and a "trigger" trace 76, all over time 78. Again, in the presently contemplated embodiment, the entire process is based on the control circuitry implementing a welding regime via closed loop control of weld voltage. Moreover, in this short circuit welding process (or some modified short circuit process), the voltage trace can be expected to show a sudden drop in voltage as the molten end of the welding electrode shorts (i.e., extends to, touches, or is bridged by molten material) to the workpiece, or in most cases, to the progressing weld puddle. Thus, at time 80, the voltage trace 74 can be seen to drop suddenly, as indicated at reference numeral 82. At this time, the current will be expected to increase from a lower level 84.

The trigger trace 76 represents a parameter that the control circuitry monitors, or in most cases may calculate, such as a first time derivative of weld voltage. Other triggering parameters may, of course, be used, such as a derivative of current, a higher derivative of voltage, a derivative of power, and so forth. As indicated by reference numeral 86, then, when the voltage drops due to the short circuit, the rate of change of voltage will show a sudden drop as well. In the presently contemplated embodiment, the control circuitry continues to regulate the voltage in a closed loop manner during this time, and at a later time 88 a sudden rise in voltage will be observed due to the clearing or imminent clearing of the short circuit. The trigger trace will exhibit a sudden spike, as indicated by reference numeral 90 due to the much higher rate of increase in the voltage waveform at this time.

In this embodiment, the sudden spike in the rate of change of weld voltage is used as a trigger to implement the current recess. Returning to the current trace, as the short circuit occurs, the current trace will rise, as indicated by reference numeral 92. Ordinarily, without the current recess, the current trace in this particular welding regime would have a sawtooth appearance over time, as illustrated. However, here the current recess 94 is implemented to reduce the current and energy input into the weld. In particular, the spike in the voltage rate of change causes the control circuitry to suspend closed loop control based on voltage (that is, in the current implementation, the command signals are stopped), and the current is allowed to drop as shown in FIG. 3. The current recess may be implemented in a number of ways, and these may determine both the onset of the recess as well as the termination or duration. In a currently contemplated embodiment, the duration of the current recess is programmable, and may be of a fixed duration (set in advance). In some cases, hard fixed durations, variable durations, operator-adjustable durations, or algorithmically computed recess termination points may be implemented. In the current implementation, the current recess may be between about 0.1 and 2 ms, and particularly between about 0.4 and 1 ms, for example, as indicated by reference numeral 96.

Following the current recess, normal voltage closed loop control is resumed. This will cause the voltage waveform to resume peaks and drops as the arc is powered and the next short circuit is developed. The current trace will exhibit a decline in current, as shown by reference numeral 98 as the electrode and weld pool part. It should be noted, however, that in this current implementation, the voltage commands that would have been implemented are still computed, any running averages of voltage are still computed, internal "inductances" are still implemented or computed, and so forth. The current recess merely interrupts application of these commands to the power conversion circuitry. Thus, after the current recess, the current trace resumes the sawtooth profile (in this case), and the recess appears as a gap "cut from" each tooth. It will be apparent to those skilled in the art, however, that some alteration in the voltage waveform itself is likely as compared to control without the current recess, owing to the effect of removal of the voltage command, and the resulting change in voltage or voltage dynamics during the current recess.

Figure 4:
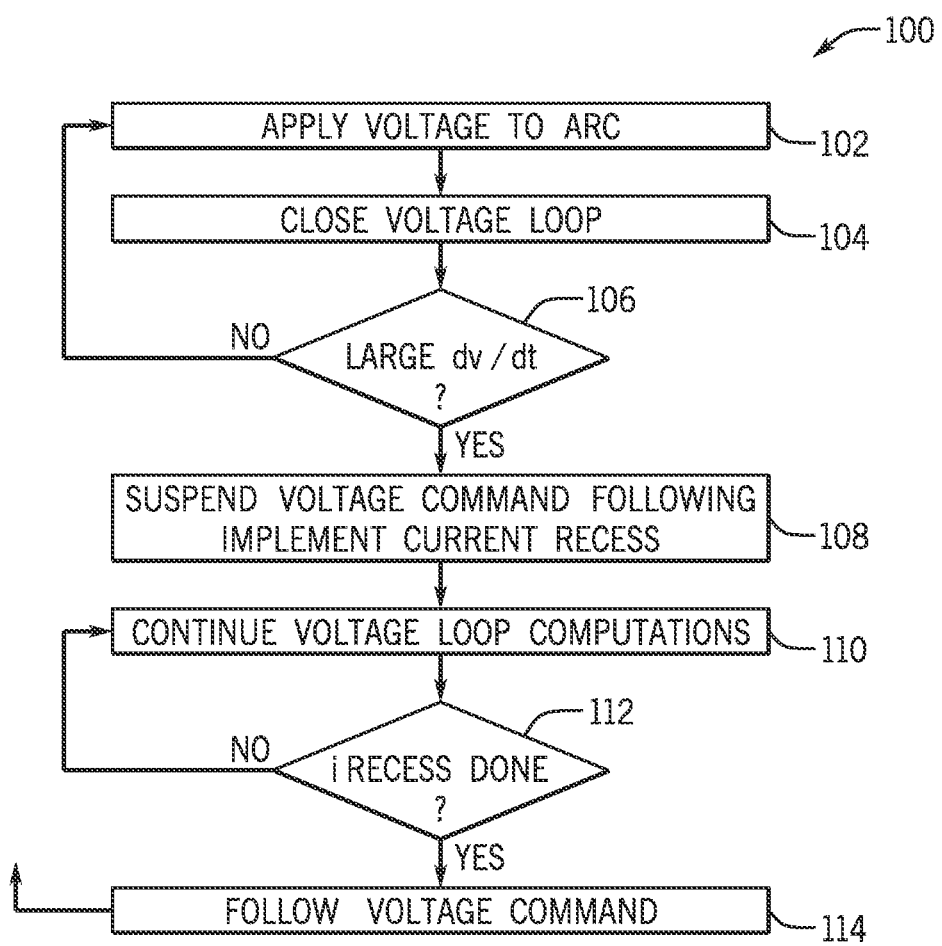
FIG. 4 is a flow chart illustrating certain control logic in implementing the welding regime of FIG. 3.

FIG. 4 illustrates exemplary control logic 100 for implementing a currently contemplated short circuit welding regime utilizing a current recess. Of course, the actual code or even the pseudocode for the welding regime will include many more details, but that are generally beyond the scope of this disclosure, and that are well within the ambit of those skilled in this art. The logic begins at step 102 where voltage is applied to the welding electrode to create and maintain the welding arc between the electrode and the workpiece (or generally with the weld puddle). At step 104, the voltage is controlled in a closed loop manner, typically by reference to a design voltage and a sensed weld voltage. As indicated at step 106, the system continuously monitors for the triggering event to initiate the current recess, which in this case is the sudden rise in the first derivative of voltage (although one or more other triggers may be referenced). In general, the triggering event here may be considered as any indication that the short circuit between the welding electrode and the weld puddle has cleared or will clear. The process continues in this way until the triggering event is detected.

Once the triggering event is detected, closed loop voltage control of welding power is suspended to create the desired current recess, as indicated by reference numeral 108. At the same time, while to create the current recess, at least in a currently contemplated embodiment, the voltage commands are simply suspended, as noted above, the control circuitry nevertheless continues to compute the command signals that would have been applied to the conversion circuitry but for the current recess, as indicated at step 110. This allows for seamlessly taking up control following the current recess. The system ultimately determines that the current recess is complete, as indicated by step 112, and once complete, resumes normal voltage closed loop control with the then-current voltage command signal. This process is repeated for subsequent cycles of the short circuit regime.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
    power conversion circuitry configured to convert incoming power from a source to welding power;
    control circuitry coupled to the power conversion circuitry and configured to:
        compute command signals via a control process to control the welding power output by the power conversion circuitry in a welding operation, the control process comprising closed loop control of voltage, detection of a predetermined rate of change of a welding parameter, suspension of the closed loop control of voltage and implementation of a current recess based at least in part on detection of the predetermined rate of change of the welding parameter, followed by resumption of closed loop control of voltage after termination of the current recess; and
        during the current recess, continue to compute the command signals that would have been applied to the power conversion circuitry but for the current recess, without applying the computed command signals to the power conversion circuitry during the current recess.

2. The system of claim 1, wherein the power conversion circuitry is configured to implement a gas metal arc welding process under the control of the control circuitry, and wherein the system comprises a wire feeder that receives the welding power and applies the welding power to a wire electrode advanced during the welding operation.

3. The system of claim 1, wherein the control circuitry is configured to detect a predetermined rate of change of welding voltage for suspension of the closed loop control of voltage and the implementation of the current recess.

4. The system of claim 1, wherein the current recess reduces current from a level that would result from continued closed loop control of voltage.

5. The system of claim 1, wherein the welding operation comprises an electrode positive process.

6. The system of claim 1, wherein the welding operation comprises an electrode negative process.

7. The system of claim 1, wherein the current recess is of a predetermined duration.

8. The system of claim 1, wherein following the termination of the current recess, the control circuitry applies then-current command signals to the power conversion circuitry continuing as if the current recess had not occurred.

9. A method comprising:
computing command signals, via control circuitry executing a voltage closed loop control, to control welding power output by power conversion circuitry in a welding process during a welding operation;
monitoring, via the control circuitry, at least one welding power parameter;
identifying, via the control circuitry, a rate of change of the at least one welding power parameter;
suspending, via the control circuitry, voltage closed loop control of the welding power upon determination that the rate of change of the at least one welding power parameter has reached or exceeded a threshold to create a current recess;
during the current recess, continuing to compute, via the control circuitry, the command signals that would have been used to control the welding power but for the current recess; and
resuming, via the control circuitry, voltage closed loop control of the welding power following termination of the current recess.

10. The method of claim 9, comprising, following the termination of the current recess, the control circuitry utilizing then-current command signals to control the power conversion circuitry.

11. The method of claim 9, wherein the rate of change comprises a first time derivative of weld voltage.

12. The method of claim 9, wherein during the welding process the weld current comprises a generally saw-tooth profile versus time, and wherein the current recess produces a current gap formed in each tooth of the saw-tooth profile.

13. The method of claim 9, wherein the welding operation comprises an electrode positive process.

14. The method of claim 9, wherein the welding operation comprises an electrode negative process.

15. The method of claim 9, wherein the current recess is of a predetermined duration.

16. A method comprising:
computing command signals, via control circuitry executing a voltage closed loop control, to control welding power output by power conversion circuitry in a welding process;
monitoring, via the control circuitry, weld voltage;
identifying, via the control circuitry, a rate of change of weld voltage to identify when rate of change of weld voltage exceeds a predetermined threshold;
based upon the weld voltage exceeding the predetermined threshold, the control circuitry suspending voltage closed loop control of the welding power to create a current recess; and
during the current recess, continuing to compute, via the control circuitry, the command signals that would have been used to control the welding power but for the current recess;
resuming, via the control circuitry, voltage closed loop control of the welding power following termination of the current recess.

17. The method of claim 16, wherein during the welding process the weld current comprises a generally saw-tooth profile versus time, and wherein the current recess produces a current gap formed in each tooth of the saw-tooth profile.

18. The method system of claim 16, wherein the current recess is of a predetermined duration.

* * * * *